United States Patent [19]

Thoen

[11] Patent Number: 5,339,016
[45] Date of Patent: Aug. 16, 1994

[54] CROSSOVER AND SPECTRAL PREEMPHASIS NETWORKS FOR ADAPTIVE INVERSE CONTROL

[75] Inventor: Bradford K. Thoen, Eden Prairie, Minn.

[73] Assignee: MTS Systems Corporation, Eden Prairie, Minn.

[21] Appl. No.: 4,710

[22] Filed: Jan. 14, 1993

[51] Int. Cl.⁵ ............................................. G05B 11/42
[52] U.S. Cl. ................................... 318/610; 318/607
[58] Field of Search ............... 318/610, 616, 609, 606, 318/607; 324/77 E, 78 F

[56] References Cited

U.S. PATENT DOCUMENTS

| | | | |
|---|---|---|---|
| 3,789,323 | 1/1974 | Anderson | 324/77 E |
| 4,481,550 | 11/1984 | Miller | 318/616 |
| 4,983,898 | 1/1991 | Kanda | 318/610 |
| 4,999,557 | 3/1991 | Inoue | 318/610 |
| 5,124,626 | 6/1992 | Thoen | 318/610 |

OTHER PUBLICATIONS

Bitmead and Anderson, "Adaptive Frequency Sampling Filters" *IEEE Transactions on Acoustics, Speech and Signal Processing*, vol. ASSP29, No. 3, Jun. 1981, pp. 684–694.

Vaidyanathan, "Multirate Digital Filters, Filter Banks, Polyphase Networks, and Applications: A Tutorial", *Proceedings of the IEEE*, vol. 78, No. 1, Jan. 1990, pp. 56, 86 and 92.

Styles, "Digital Hydraulic Controllers-a Path to High--Accuracy Component Testing" *Environmental Engineering*, Jun. 1990, pp. 6–8 and 14.

"Focus on ATE and CAD Aspects of Computer-Aided-Testing" *Automotive Engineer*, Feb./Mar. 1991, pp. 18–20.

Widrow and Stearns, *Adaptive Signal Processing*, Prentice-Hall, Inc. 1985, Chapters 4, 5, 6 and 11, (pp. 46–116 and 271–301).

Primary Examiner—William M. Shoop, Jr.
Assistant Examiner—John W. Cabeca
Attorney, Agent, or Firm—Kinney & Lange

[57] ABSTRACT

A feedback control system provides an adjusted command signal to a plant in response to a command signal having a plurality of command signal components. The plant controls a subsystem and provides a feedback signal representative of the subsystem's achieved response to the adjusted command signal. An adaptive filter adjusts the amplitude and phase of relatively high frequency command signal components in accordance with a dynamic behavior of the adaptive filter. A compensation device adjusts a dynamic behavior of the adaptive filter in response to the feedback signal and the adjusted command signal. In one form of the invention, a low-pass filter passes command signal components of relatively low frequency, and a summing element generates the adjusted command signal in response to the output from the adaptive filter and the command signal components passed by the low-pass filter. In another form of the invention, a spectral preemphasis filter increases the power of the signal components of the feedback signal and the adjusted command signal in proportion to the frequency of the signal components.

22 Claims, 6 Drawing Sheets

CROSSOVER AND SPECTRAL PREEMPHASIS NETWORKS FOR ADAPTIVE INVERSE CONTROL

BACKGROUND OF THE INVENTION

The present invention relates to a closed-loop control system, and more particularly, to feedback control systems utilizing adaptive inverse control to adjust output signals in a test system.

A feedback control system operates to achieve prescribed relationships between selected system variables by comparing functions of those variables and using the comparison to affect control. System variables are those quantities or conditions of the system which are subject to change. Examples of such variables include an electrical voltage level generated by an amplifier or physical force applied to a specimen by a servoactuator. Control is the governing of the response of the controlled subsystem such as rotational velocity of an electrical motor, strain in a structural member of a truss, or position of an elevator. A sinusoidal signal amplitude and phase control for an adaptive feedback control system is disclosed in the Thoen U.S. Pat. No. 5,124,626, assigned to the same assignee as the present invention, and herein incorporated by reference.

Changes in operating conditions or in transfer functions of system elements can affect a feedback control system. External disturbances can also affect any system variable. While such external disturbances do not themselves change the transfer function of the system, they can affect system accuracy in following the desired function values. In addition, under the influence of an experiment, physical changes can occur in the controlled subsystem which change the subsystem's transfer characteristics over time. Such changes affect the output response generated by a particular actuation signal and necessitate repeated returning of the control system in some experiments.

Adaptive inverse control (AIC) is a technique for achieving good tracking response in a closed loop control system. AIC places an adaptive filter between a function generator and a feedback loop comprising a subsystem to be controlled. The feedback loop is commonly referred to as a plant. The purpose of the adaptive filter is to compensate for the plant's frequency response irregularities. If the adaptive filter has a dynamic behavior which substantially matches the inverse frequency response function of the plant, an overall input-output frequency response of unity is achieved over a broad range of frequencies. A key to adaptive inverse control is that a network adjusts the inverse frequency response function applied to the filter while the plant is actually operating, or on line. In this way, the controller adapts to changing conditions.

SUMMARY OF THE INVENTION

The present invention relates to a feedback control system providing an adjusted command signal to a plant. The plant controls a subsystem and provides a feedback signal representative of the subsystem's achieved response to the adjusted command signal. The control system includes a controller responsive to a command signal having a plurality of command signal components, each having a distinct amplitude and phase at a distinct frequency in a range of relatively high and low frequencies. The controller includes an adaptive filter for adjusting the amplitude of the relatively high frequency command signal components in accordance with the dynamic behavior of the adaptive filter. The control system also includes a compensation device for adjusting a dynamic behavior of the adaptive filter in response to the feedback signal and the adjusted command signal.

Typically, the plant has a dynamic behavior and the compensation device adjusts the dynamic behavior of the adaptive filter to substantially match the inverse of the dynamic behavior of the plant. The compensation device preferably includes a least-mean-square network for approximating the dynamic behavior of the plant.

In a preferred embodiment of the present invention, the controller includes a low-pass filter for passing command signal components of relatively low frequency, and a summing element for generating the adjusted command signal in response to the output from the adaptive filter and the command signal components passed by the low-pass filter. In this embodiment, the compensation device includes a second adaptive filter for adjusting the amplitude of relatively high frequency feedback signal components in accordance with a dynamic behavior, a second low-pass filter for passing feedback signal components of relatively low frequency, and a second summing element for generating an adjusted feedback signal in response to the output from the second adaptive filter and the feedback signal components passed by the second low-pass filter. The compensation device also includes a delay network and a difference element providing a signal representative of the difference between the adjusted feedback signal and a delayed adjusted command signal.

In another embodiment of the present invention, the compensation device includes spectral preemphasis filters and a second adaptive filter. The spectral preemphasis filters increases the power of the signal components of the feedback signal and the adjusted command signal in proportion to the frequency of the respective signal components. The second adaptive filter adjusts the feedback signal filtered by the feedback signal preemphasis filter. A compensation device approximates a dynamic behavior of the plant in response to outputs from the spectral preemphasis filters to adjust the dynamic behavior of the adaptive filters.

Optionally, the feedback signal preemphasis filter may be used in conjunction with a crossover filter network for passing the relatively high frequency feedback signal components through the adaptive filter and diverting the relatively low frequency feedback signal components from the adaptive filter A summing element adds the output of the adaptive filter and the diverted relatively low frequency feedback signal components to produce the adjusted feedback signal.

DETAILED DESCRIPTION OF THE PREFERRED EMBODIMENTS

Like reference characters will be used for like elements throughout the drawings. A prior art control system utilizing adaptive inverse control (AIC) is generally indicated at 10 in FIG. 1. A function generator 12 generates a command signal, indicated at 13, that is sent to control system 10. Feedback control system 10 controls the output response of a controlled subsystem 14.

Figure 1:
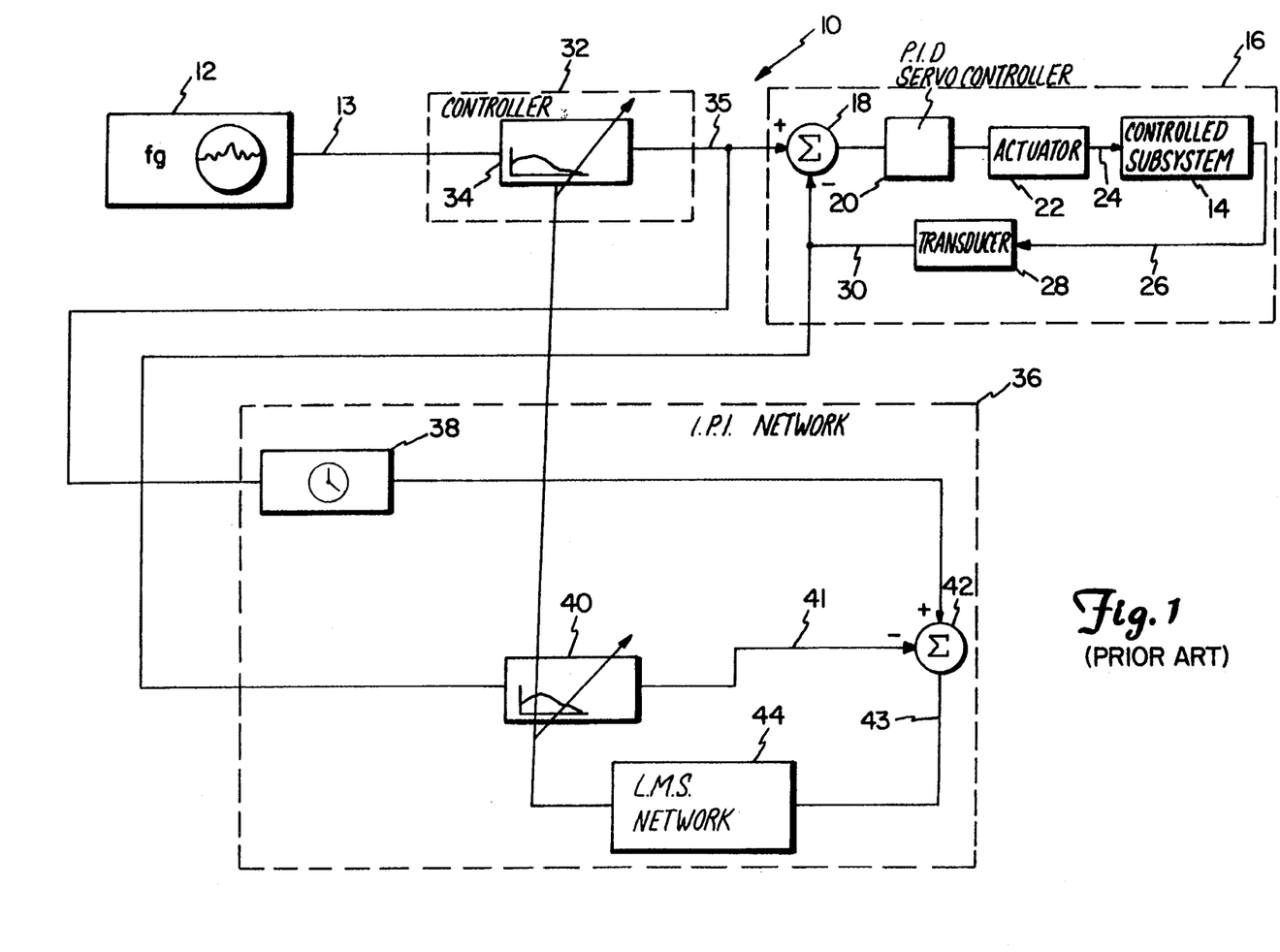
FIG. 1 is a block diagram of a prior art control system utilizing adaptive inverse control.

A negative feedback loop 16 directly controls subsystem 14 which is contained within feedback loop 16. Feedback loop 16 includes a summing element 18 which subtracts a feedback signal, indicated at 30, from an adjusted command signal, indicated at 35, to generate an error signal. A servocontroller 20, such as a proportional-integral-derivative (PID) servocontroller, responds to the error signal to provide an actuation signal. Art actuator 22 responds to the actuation signal to directly mechanically manipulate a drive variable, indicated by arrow 24, to controlled subsystem 14. The achieved response of controlled subsystem 14 is a directly controlled mechanical variable, indicated by arrow 26, and is applied to a transducer 28 which measures the achieved response 26 and generates the feedback signal 30. The parameters of servocontroller 20 can be adjusted manually or with an auto-tuning algorithm.

As an example of feedback loop 16 (also referred to as plant 16) controlled subsystem 14 is an automobile suspension under test, actuator 22 is a servohydraulic mechanism designed to mechanically vibrate the suspension in response to an actuation signal, PID servocontroller 20 provides the actuation signal to simulate road conditions for the suspension under test, and transducer 28 measures the achieved mechanical response of the suspension and generates the electrical feedback signal 30.

Control system 10 utilizes AIC as a technique for achieving good tracking response in the control system. A controller 32 is interposed between function generator 12 and feedback loop 16 An adaptive filter 34 is contained in controller 32 and compensates for frequency response irregularities in plant 16. Adaptive filter 34 is preferably implemented with a finite impulse response (FIR) digital filter responsive to an inverse plant identifier (IPI) network 36. If adaptive filter 34 provides the inverse frequency response function of the plant 16, an overall input/output frequency response of unity can be achieved over a broad range of frequencies.

IPI network 36 approximates the inverse frequency response function of plant 16 on line, or while system 10 is operating, and adjusts the frequency response function of adaptive filter 34 to substantially match the inverse frequency response function of plant 16. By approximating the dynamic behavior of plant 16 on line, control system 10 adapts to changing conditions.

IPI network 36 matches the command signal from function generator 12 to feedback signal 30. Automatic matching of the feedback signal 30 and the command signal 13 requires comparison of the command signal and the feedback signal or some representation of these signals. In control system 10, the output of adaptive filter 34, indicated at 35, is the adjusted command signal, and adjusted command signal 35 and feedback signal 30 are provided to IPI network 36. Adjusted command signal 35 is delayed by causality delay circuit 38, the purpose of which is to delay the adjusted command signal to match the delay caused by plant 16 such as the delay in the feedback signal 30 resulting from mechanical translations at 24 and 26. By delaying the output of adaptive filter 34, the adaptive filter does not need to be a prediction filter. An adaptive filter 40 which is substantially identical to the first adaptive filter 34, provides an adjusted feedback signal, indicated at 41. The output of causality delay circuit 38 and the adjusted feedback signal 41 are compared by a summing element 42, which subtracts the adjusted feedback signal from the causality delay 38 output to generate a difference or error signal, indicated at 43.

It will be appreciated that the adjusted feedback signal at 41 represents an estimate of the adjusted command signal at 35 that gave rise to the feedback signal at 30. More particularly, summing element 42 compares the actual adjusted command signal to the estimated adjusted command signal. If adaptive filters 34 and 40 accurately represent the inverse frequency response of plant 16, the actual and estimated adjusted command signals will be equal; if adaptive filters 34 and 40 do not represent the response of plant 16, an error signal results at 43. Error signal 43 is provided to a least-mean-square (LMS) algorithm network 44. The LMS algorithm utilizes a steepest descent type of adaptive algorithm in approximating the dynamic behavior of plant 16. LMS network 44 provides an output to adjust both adaptive filters 34 and 40 in the same manner. Hence, both the command signal and the feedback signal are filtered through substantially identical adaptive filters prior to being compared.

Figure 2:
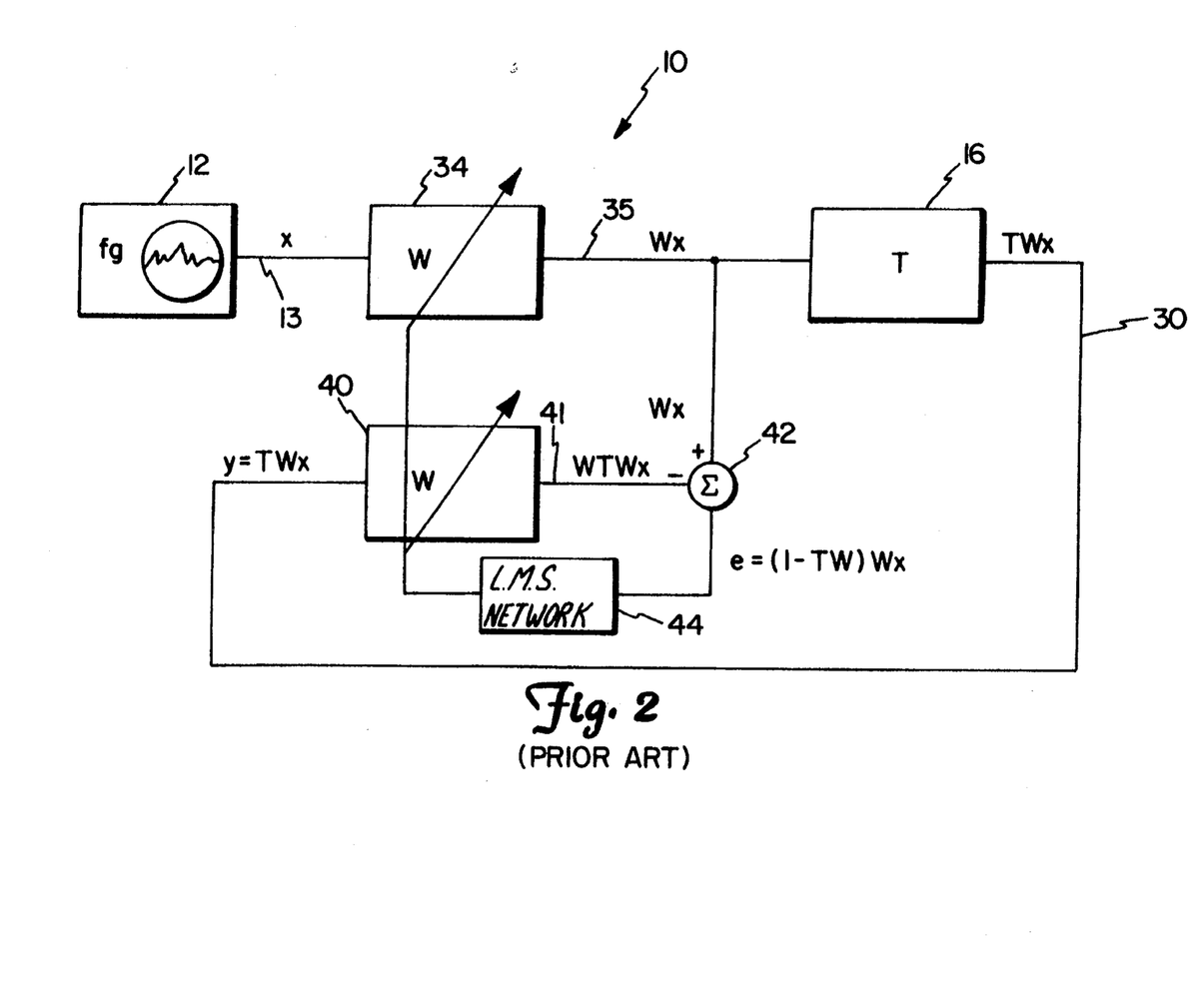
FIG. 2 is an operational block diagram illustrating the operation of adaptive inverse control for the prior art control system of FIG. 1.

The operation of AIC is illustrated in FIG. 2. The command signal 13 from function generator 12 is represented by x. The dynamic behavior or transfer function of plant 16 is represented by T. The transfer function of the adaptive filters 34 and 40 is represented by W. Thus, the adjusted command signal 35 produced by adaptive filter 34 is represented by Wx, and the feedback signal 30 generated by plant 16 is represented by TWx. The adjusted feedback signal 41 from adaptive filter 40 is represented by WTWx. Therefore, the inputs into summing element 42 are Wx and WTWx, which produces the error signal 43 represented by an error of $e = (1-TW)Wx$. When the error (e) is equal to zero, $1-TW=0$. Correspondingly, when $e=0$, $W=T^{-1}$, which is another way of expressing that adaptive filter 34 and adaptive filter 40 have a transfer function equal to the inverse frequency response function of plant 16 when the error is equal to zero. Thus, LMS algorithm network 44 approximates the inverse transfer function of plant 16 by receiving the error signal represented by e, and correspondingly adjusts the transfer function of filters 34 and 40 by adjusting the filter's weight vector represented by W to drive the value of e to zero.

Assuming that $W_k$ is equal to the LMS algorithm weight vector and $Y_k$ is equal to the input vector at time k, then the LMS algorithm is expressed by the following equation:

$$W_{k+1} = W_k + 2\mu Y_k e_k$$

Where e = the error signal; and

μ = the gain constant that regulates the speed and stability of adaption.

The LMS algorithm is implemented in a practical system without squaring, averaging, or differentiation and, therefore, offers simplicity and efficiency. Because the LMS algorithm does not perform averaging, the gradient components contain a large component of noise, but the noise is attenuated with time by the adaptive process, which essentially acts as a low-pass filter in this respect.

The command signal 13 from function generator 12 comprises a plurality of signal components, each having a distinct amplitude and a distinct frequency in a range of relatively high and low frequencies. In typical automobile suspension testing, the command signal comprises signal components with frequencies ranging from approximately 0 to 50 Hz. The control system 10 illustrated in FIG. 1 utilizes AIC over all frequency ranges of the command signal. One problem with this approach is that AIC inadequately tracks the low frequency signal components of the command signal. It is commonly known in adaptive filter theory that the impulse response of the adaptive filter must be at least as long as the impulse response of the plant. Because low frequencies correspond to a long impulse response in plant 16, adaptive filter 34 must have many coefficients. Processor loading and memory usage limitations, however, demand that the number of filter coefficients be kept to a manageable minimum. Another reason to minimize the number of coefficients in adaptive filter 34 is that as the number of coefficients in the adaptive filter increase, the rate of convergence decreases and the error floor increases. As a result of limiting the number of coefficients in adaptive filter 34, the filter impulse response is truncated, which effectively places a lower bound on the bandwidth of operation. The lower bound on the bandwidth of operation presents a significant problem in control systems that must track frequencies down to DC or effectively zero.

Even though AIC inadequately tracks the low frequency signal components of the command signal, a conventional PID controller is good at tracking low frequency signal components. A control system according to the present invention is generally indicated at 50 in FIG. 3. The control system 50 utilizes a construction which takes advantage of the good tracking of relatively low frequency signal components by a PID controller and the good tracking of relatively high frequency signal components by AIC.

Figure 3:
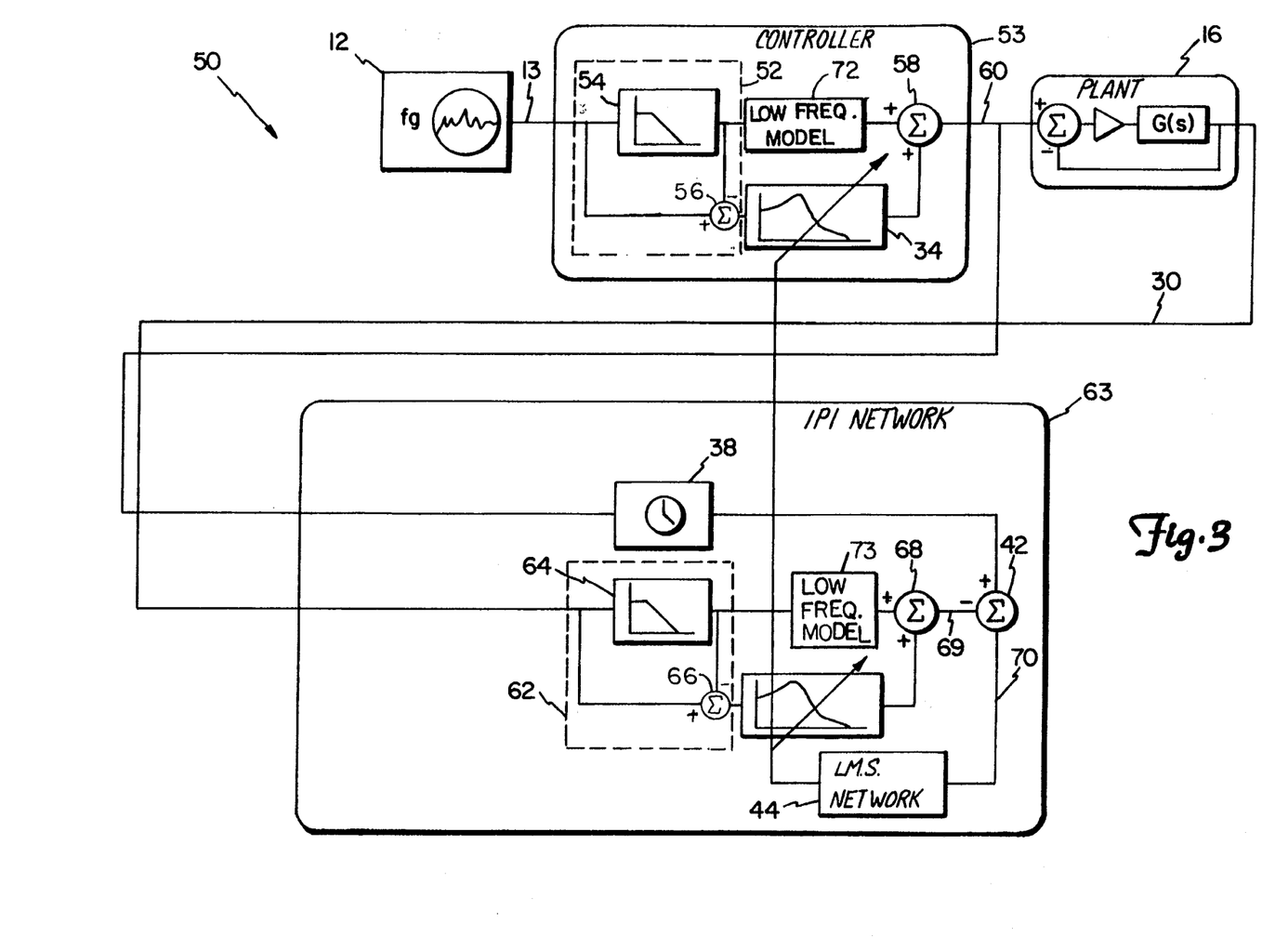
FIG. 3 is a block diagram of a control system according to the present invention utilizing adaptive inverse control and crossover filters.

Control system 50 includes a crossover network 52 which is interposed within a controller 53 between function generator 12 and adaptive filter 34. Crossover network 52 includes a low-pass filter 54 and a summing element 56. The command signal 13 from function generator 12 is coupled to the input of low-pass filter 54 and to summing element 56. Low-pass filter 54 operates to pass the relatively low frequency signal components of the command signal to its output and prevents relatively high frequency signal components from reaching the low-pass filter's output. Summing element 56 subtracts the low frequency signal passed by filter 54 from the command signal at 13 to thereby pass relatively high frequency signal components of the command signal. The output signal from summing element 56 is coupled to the input of adaptive filter 34. The output of adaptive filter 34 is coupled to low frequency model 72. The operation of the low frequency model is explained below and model 72 is either a low frequency filter or a direct connection depending on the mode of control. The output of adaptive filter 34 (through low frequency model 72) and the output of low-pass filter 54 are coupled to a summing element 58. Summing element 58 adds the signals from the adaptive filter 34 output and the low-pass filter 54 output and generates an adjusted command signal, indicated at 60. Thus, low frequency signal components of command signal 13 pass through controller 53 unaltered via low-pass filter 54 whereas the high frequency signal components of command signal 13 are routed through adaptive filter 34 via summing element 56. Because summing element 56 of crossover network 52 subtracts the low frequency signal amplitudes as passed by low pass filter 54 from the command signal amplitudes, the resulting high and low frequency signals passed to summing element 58 and adaptive filter 34 are implemented with smooth and overlapping transition bands with medium frequency signal components of command signal 13 being divided in proportion to their frequencies between the low frequency and high frequency paths. In a typical servohydraulic position control system, a typical crossover point between the low pass and high-pass bands is about 20 Hz. However, the exact crossover frequency used is not a particularly critical factor and can be used as a tuning factor in control system 50.

As with control system 10, IPI network 63 provides an error signal to LMS network 44 to control adaptive filters 34 and 40. For this purpose, a crossover network 62 and summing element 68, substantially identical to crossover network 52 and summing element 58, are inserted within IPI network 63 to separate the high and low frequency components of the feedback signal 30.

Crossover network 62 includes a low-pass filter 64 and a summing element 66 substantially identical to the low-pass filter and summing element used in crossover network 52. Filter 64 and summing element 66 operate on feedback signal 30 in substantially the same manner as filter 54 and summing element 56 operate on command signal 13. The output signal from summing element 66 is coupled to the input of adaptive filter 40. The output of adaptive filter 64 is coupled to low frequency model 73. Low frequency model is substantially similar to low frequency model 72 and the operation of the low frequency model is explained below. As with model 72, model 73 is either a low frequency filter or a direct connection depending on the mode of control. The output of adaptive filter 40 and the output of low-pass filter 64 (through low frequency model 73) are coupled to the summing element 68. Summing element 68 adds the signals from the adaptive filter 40 output and the low-pass filter 54 output to generate an adjusted feedback signal, indicated at 69. The adjusted command signal 60 is delayed by causality delay circuit 38 in the same manner as adjusted command signal 35 is delayed in control system 10. Summing element 42 subtracts the adjusted feedback signal 69 from the causality delay 38 output to generate a difference or error signal, indicated at 70. Error signal 70 is provided to LMS algorithm network 44, which adjusts both adaptive filters 34 and 40 as previously described.

Crossover network 52 allows the PID controller 20 (FIG. 1) to control subsystem 14 in response to low frequency signal components of command signal 13 and allows the AIC performed by adaptive filter 34 to adjust the high frequency signal components of the command signal. Thus, crossover network 52 permits the AIC to control the subsystem where it is most effective and permits the PID controller to solely control the subsystem in the frequency ranges where AIC is inadequate to effectively track the command signal. Consequently, good tracking of the command signal is achieved over a broad frequency range. Moreover, crossover network 52 ensures reasonable tracking of the command signal during system start-up while the LMS algorithm 44 is learning the inverse frequency response function of plant 16.

Optionally, controller 53 and IPI network 63 may also include low frequency models 72 and 73 respectively which are low frequency filters which represent the desired low frequency behavior of plant 16. Models 72 and 73 convert one physical quantity to another and are used in "mixed mode" controls. Without models 72 and 73, the mode of operation is a "non-mixed mode" control because the physical quantity controlled by the adaptive loop is the same as that controlled by the PID loop. Hence, low frequency signals are passed without alteration and models 72 and 73 are simply a direct connection.

In some cases, particularly in automobile suspension testing apparatus, it is desirable to control acceleration at the automobile tire spindle. The hydraulic actuators 22 (FIG. 1) which mechanically operate the automobile suspension operate in response to position control signals, rather than acceleration signals. Conversely, the accelerometer transducer 28 (FIG. 1) is an acceleration feedback signal to the IPI network 63. In this case, the IPI network 63 controls adaptive filter 34 for the high frequency components of the command signal, as previously described, and the result is added to the low frequency components as modified by model 72. In the case of acceleration, the low frequency filter of model 72 is a double integrator which converts the low frequency acceleration command signal to the equivalent stroke command or position signal to control the hydraulic actuator. Consequently, the system operates in a "mixed mode" where the loop comprising IPI network 63 and controller 53 operate on acceleration signals and the loop comprising PID controller 20 operates on position signals. Model 72 converts acceleration signals to position signals.

Figure 4:
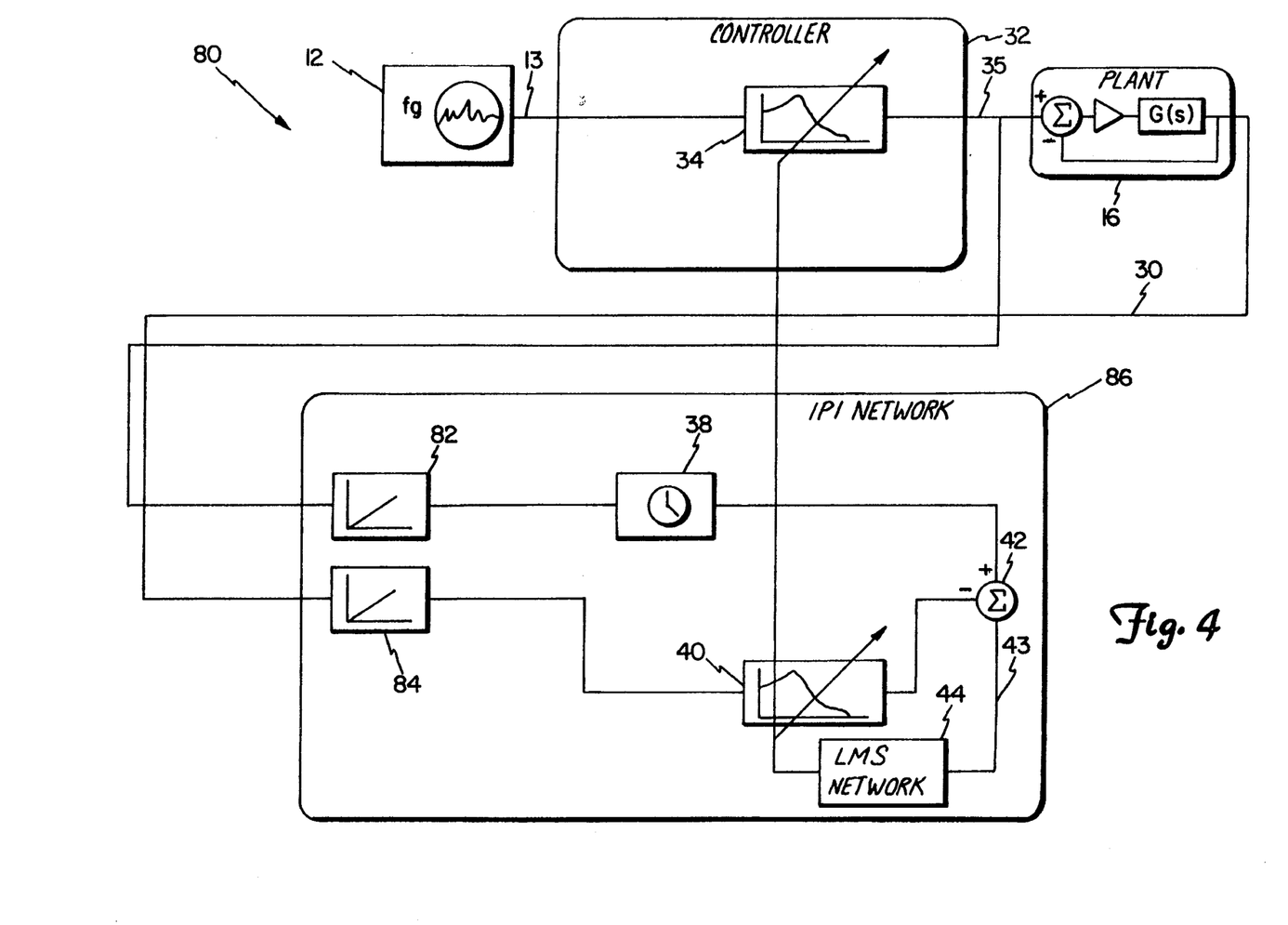
FIG. 4 is a block diagram of a control system according to the present invention utilizing adaptive inverse control and preemphasis filters.

FIG. 4 illustrates a modification of the control system according to the present invention. Control system 80 is similar to control system 10 illustrated in FIG. 1 except that it employs spectral preemphasis filters 82 and 84 at the inputs to causality delay circuit 38 and adaptive filter 40 in an IPI network 86.

The feedback signal 30 and the adjusted command signal 35 that are provided to IPI network 86 comprise a plurality of signal components, each having a distinct signal power and a distinct frequency. Adaptive filter theory predicts that the convergence rate of the IPI network is directly proportional to the signal power of the input signals to the IPI network. In durability testing, the power of the feedback signal components and the adjusted command signal components generally decreases at a rate proportional to the frequency of the signal component or the square of the frequency of the signal component. As a result, signal components with relatively low frequencies have stronger signal power and generally converge faster than signal components with relatively high frequencies which have weaker signal power. Because of this known relationship, spectral preemphasis filters 82 and 84 are designed to boost the weaker power higher frequency signal components and suppress the stronger power lower frequency components of feedback signal 30 and adjusted command signal 35. Consequently, AIC control system 80 produces a constant convergence rate over a broad frequency range. Spectral preemphasis filters 82 and 84 are implemented with a simple single or double differentiating filter. In other words, spectral preemphasis filters 82 and 84 are implemented with either a filter transfer function corresponding to an increasing power rate proportional to the frequency of the signal component or a filter transfer function corresponding to an increasing power rate proportional to the square of the frequency of the signal component.

Figure 5:
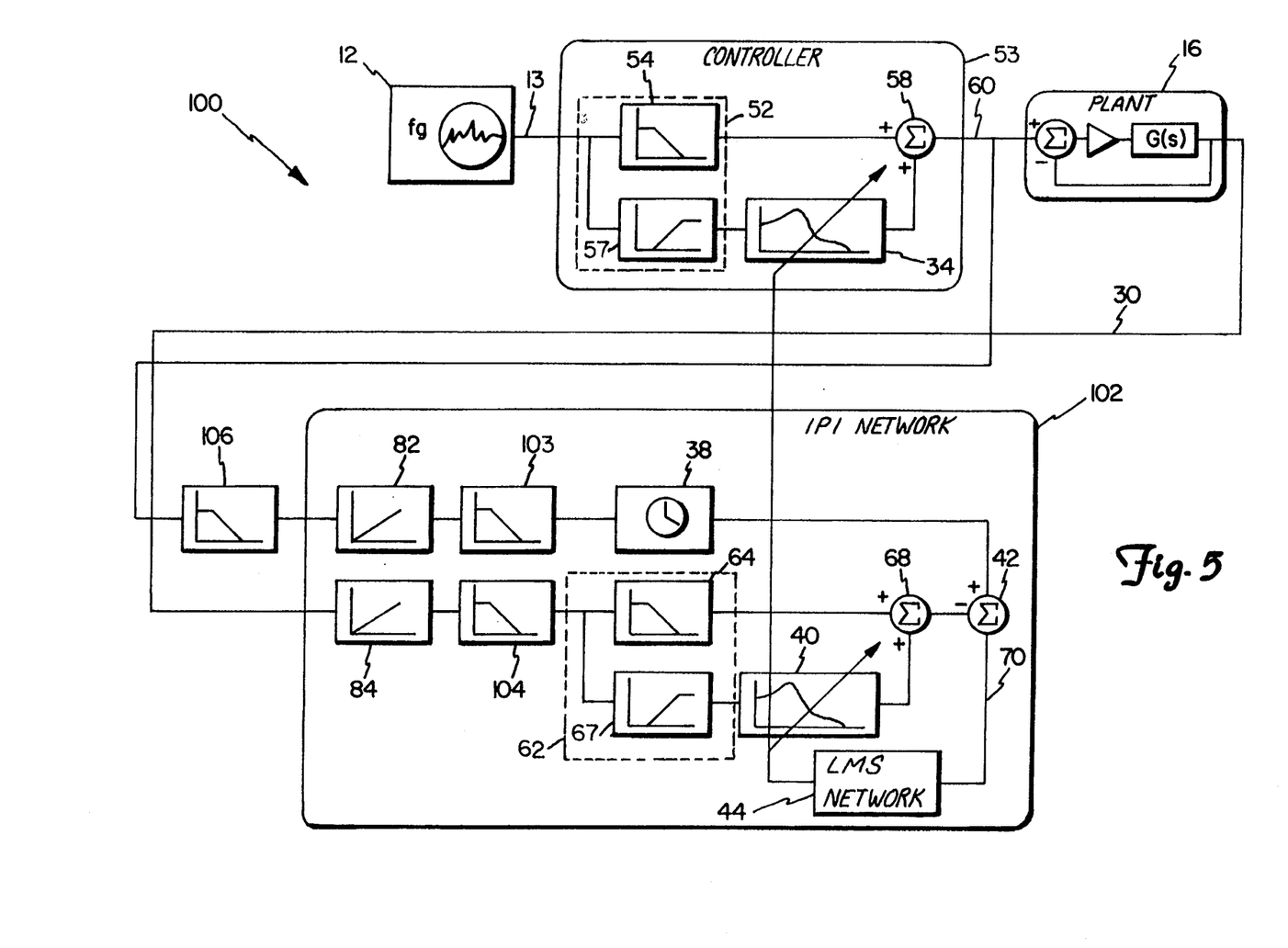
FIG. 5 is a block diagram of a control system according to the present invention utilizing adaptive inverse control, crossover filters, and preemphasis filters.

FIG. 5 illustrates a control system incorporating features from both control system 50 and control system 80. FIG. 5 does not show the low frequency models 72 and 73 which are illustrated in FIG. 3 and are used in "mixed mode" controls. Control system 100 includes an IPI network 102. IPI network 102 comprises the spectral preemphasis filters 82 and 84, which function as described above in reference to control system 80. Control system 100 also includes the crossover networks 52 and 62 which are preferably substantially identical to crossover networks 52 and 62 described above. Alternatively, crossover network 52 may comprise low pass filter 54 and high pass filter 57 connected in parallel, and crossover network may comprise low pass filter 64 and high pass filter 67 connected in parallel; filters 54 and 57 are functionally equivalent to filter 54 and summing element 56, and filters 64 and 67 are functionally equivalent to filter 64 and summing element 66, both described in reference to control system 50 illustrated in FIG. 3. Thus, control system 100 allows the PID controller to solely control the controlled subsystem in response to low frequency signal components of command signal 13, and allows AIC to further adjust the high frequency components of command signal 13 through adaptive filter 34.

Control system 100 also incorporates the advantages of the preemphasis filters to boost the power of the higher frequency signal components of feedback signal 30 and adjusted command signal 60 which have a longer convergent rate because of their lower power as explained above.

Control system 100 optionally includes band limiting filters indicated at 103 and 104 in FIG. 5. Band limiting filters 103 and 104 substantially eliminate undesirable high frequency components of the outputs of the spectral preemphasis filters 82 and 84. For example, if a test system has a range of between 0–50 Hz, the band limiting filters 103 and 104 are typically designed to attenuate signals greater than 50 Hz.

Control system 100 also optionally includes a reference model 106. The reference model 106 is coupled to adjusted command signal 60 before signal 60 is sent to spectral preemphasis filter 82. The reference model 106 is used if a transfer function other than unity is desired. Thus, reference model 106 permits adjustment of the system in such a way that its overall input/output response characteristic substantially matches a reference model response or some other form of ideal response instead of an input/output ratio of unity. For example, a soft ride or a stiff ride of an automobile can be inserted into the system.

Figure 6:
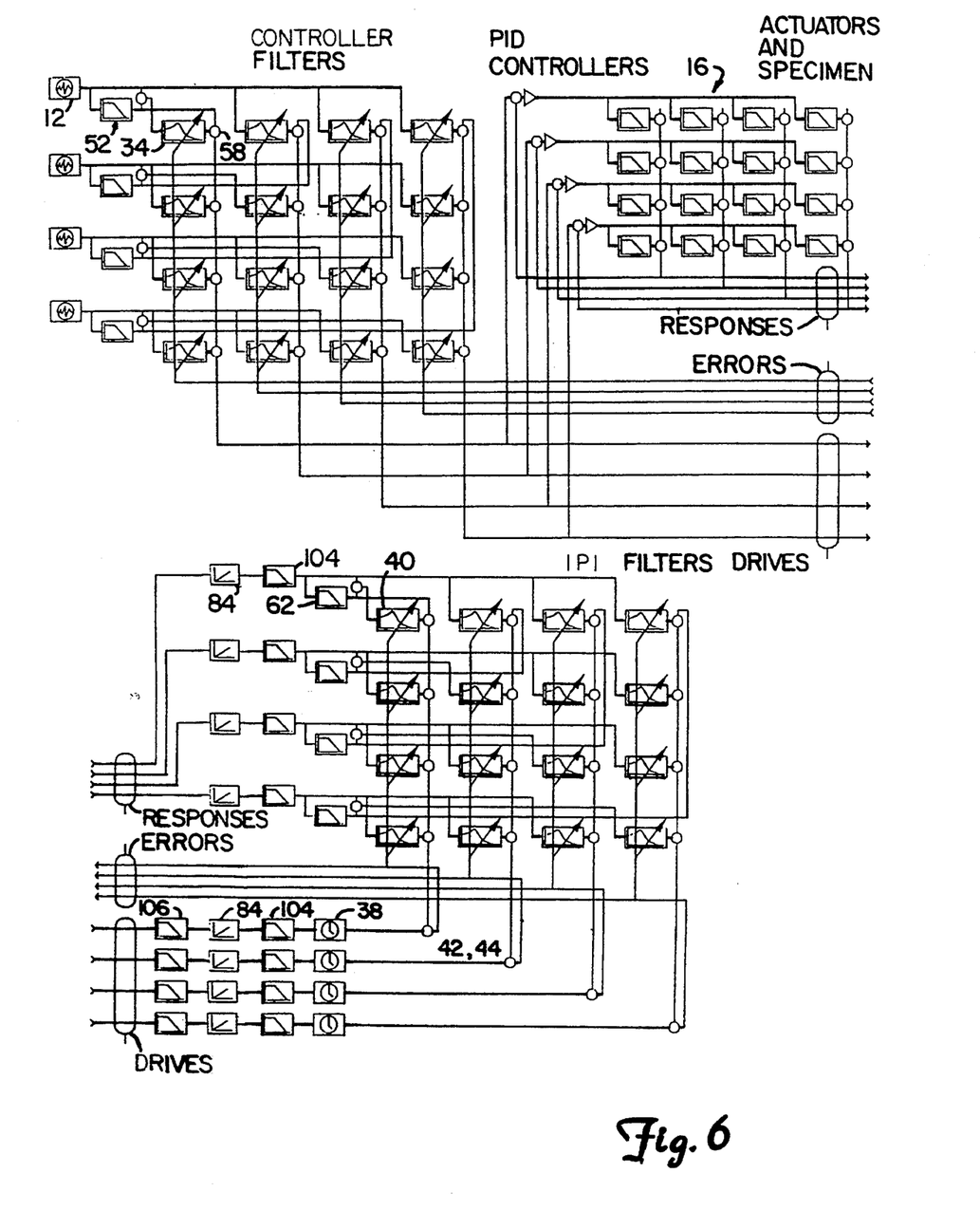
FIG. 6 is a general schematic block diagram illustrating the processing of multiple inputs and outputs in an adaptive inverse control system according to the present invention.

Many test systems process multiple inputs and multiple outputs. A crossover network limiting AIC to the relatively high frequency ranges where AIC is most effective can be applied to multiple input/output control systems. FIG. 6 illustrates the processing of multiple input command signals from function generators with multiple adaptive inverse filters in an AIC control system utilizing crossover networks according to the present invention. The control system illustrated in FIG. 6 utilizes the crossover networks as described above and shown in FIG. 3 for control system 50, but utilizes multiple adaptive filters so that multiple controlled subsystems are controlled in response to multiple input command signals.

Although the present invention has been described with reference to preferred embodiments, workers skilled in the art will recognize that changes may be made in form and detail without departing from the spirit and scope of the invention.

What is claimed is:

1. A feedback control system providing an adjusted command signal to a plant, which controls a subsystem and provides a feedback signal representative of the subsystem's achieved response to the adjusted command signal, the control system comprising:

controller means responsive to a command signal having a plurality of command signal components, each command signal component having a distinct amplitude and a distinct frequency in a range of relatively high and low frequencies, the controller means comprising:

an adaptive filter for adjusting the amplitude of the relatively high frequency command signal components in accordance with a dynamic behavior of the adaptive filter, means for passing at least the relatively low frequency command signal components, and summing means for generating the adjusted command signal in response to the output from the adaptive filter and the command signal components passed by the means for passing; and compensation means for adjusting a dynamic behavior of the adaptive filter in response to the feedback signal and the adjusted command signal.

2. The feedback control system according to claim 1 wherein the plant has a dynamic behavior and the compensation means adjusts the dynamic behavior of the adaptive filter to substantially match the inverse of the dynamic behavior of the plant.

3. The feedback control system according to claim 2 wherein the compensation means includes least-mean-square algorithm means for approximating the dynamic behavior of the plant.

4. The feedback control system according to claim 1 wherein the means for passing includes a low frequency filter for filtering the low frequency components of the command signal to represent a low frequency behavior of the plant.

5. The feedback control system according to claim 1 wherein the feedback signal comprises a plurality of signal components, each signal component having a distinct amplitude and a distinct frequency in a range of relatively high and low frequencies, and wherein the compensation means comprises:

a second adaptive filter for adjusting the amplitude of relatively high frequency feedback signal components in accordance with a dynamic behavior;

second means for passing at least the relatively low frequency feedback signal components; and second summing means for generating an adjusted feedback command signal in response to the output from the second adaptive filter and the feedback signal components passed by the second means for passing.

6. The feedback control system according to claim 5 wherein the first-named means for passing includes a first low frequency filter for filtering the low frequency components of the command signal to represent a low frequency behavior of the plant, and the second means for passing includes a second low frequency filter for filtering the low frequency components of the feedback signal, the second low frequency filter exhibits filtering characteristics similar to the first low frequency filter.

7. The feedback control system according to claim 1 wherein the compensation means includes a delay means for providing a delayed adjusted command signal.

8. The feedback control system according to claim 1 wherein the feedback signal and the adjusted command signal each comprises a respective plurality of signal components, each signal component having a distinct power and a distinct frequency, the control system further comprising:

spectral preemphasis filter means for increasing the power of the signal components of the feedback signal and the adjusted command signal in proportion to the frequency of the respective signal components.

9. The feedback control system according to claim 1 further comprising:

band limiting filter means for substantially eliminating undesirable frequency signal components of the feedback signal and the adjusted command signal.

10. The feedback control system according to claim 1 further comprising:

adapter means for adapting the adjusted command signal to conform to a reference model to cause the overall transfer function of the control system to substantially match the reference model response instead of an overall transfer function of unity.

11. The feedback control system according to claim 1 wherein the plant controls a plurality of subsystems, each subsystem providing a respective feedback signal representative of the respective subsystem's achieved response to a respective adjusted command signal, wherein there are a plurality of the controller means and each of the controller means is responsive to a respective command signal to generate a respective adjusted command signal, and wherein there are a plurality of the compensation means and each compensation means adjusts a dynamic behavior of the respective adaptive filter of the respective controller means in response to the respective feedback signal and the respective adjusted command signal.

12. A feedback control system providing an adjusted command signal to a plant in response to a command signal, the plant controlling a subsystem and providing a feedback signal representative of the subsystem's achieved response to the adjusted command signal, the command signal and the feedback signal each having a respective plurality of command signal components, each command signal component having a distinct amplitude and a distinct frequency in a range of relatively high and low frequencies, the control system comprising:

a first crossover filter receiving the command signal and having a first output passing at least the relatively low frequency command signal components and a second output passing command signal components for relatively high frequency;

a first adaptive filter connected to the second output of the first crossover filter and adjusting the amplitude of the high frequency signal components of the command signal in accordance with a dynamic behavior;

first summing means connected to the first output of the first crossover filter and to the first adaptive filter for summing the command signal components passed by the first output of the first crossover filter and the adjusted high frequency signal components of the command signal to provide an adjusted command signal;

a second crossover filter substantially similar to the first crossover filter and receiving the feedback signal and having a first output passing at least the relatively low frequency feedback signal components and a second output passing feedback signal components of relatively high frequency;

a second adaptive filter substantially similar to the first adaptive filter and connected to the second output of the second crossover filter and adjusting the amplitude of the high frequency signal components of the feedback signal in accordance with a dynamic behavior;

second summing means connected to the first output of the second crossover filter and to the second adaptive filter for summing the feedback signal components passed by the first output of the second crossover filter and the adjusted high frequency signal components of the feedback signal to provide an adjusted feedback signal;

delay means for delaying the adjusted command signal;

comparison means for generating an error signal representative of the difference of the delayed adjusted command signal and the adjusted feedback signal; and compensation means for approximating a dynamic behavior of the plant in response to the error signal to adjust the dynamic behavior of the first and second adaptive filters.

13. The feedback control system according to claim 12 further including a first low frequency filter connected between the first output of the first crossover filter and the first summing means to represent a low frequency behavior of the plant, and a second low frequency filter similar to the first low frequency filter connected between the first output of the second crossover filter and the second summing means.

14. The feedback control system according to claim 12 wherein the first crossover filter comprises a first low-pass filter receiving the command signal for passing command signal components of relatively low frequency and third summing means for subtracting the passed low frequency command signal components from the command signal to pass command signal components of relatively high frequency, and the second crossover filter comprises a second low-pass filter receiving the feedback signal for passing feedback signal components of relatively low frequency and fourth summing means for subtracting the passed low frequency feedback signal components from the feedback signal to pass feedback signal components of relatively high frequency.

15. The feedback control system according to claim 12 wherein the first crossover filter comprises a first low-pass filter receiving the command signal for passing command signal components of relatively low frequency and a first high-pass filter receiving the command signal for passing command signal components of relatively high frequency, and the second crossover filter comprises a second low-pass filter receiving the command signal for passing command signal components of relatively low frequency and a second high-pass filter receiving the command signal for passing command signal components of relatively high frequency.

16. A feedback control system providing an adjusted command signal to a plant, which controls a subsystem and provides a feedback signal representative of the subsystem's achieved response to the adjusted command signal, the feedback signal and the adjusted command signal each comprising a respective plurality of signal components, each signal component having a distinct power and a distinct frequency, the control system comprising:

controller means for providing the adjusted command signal in response to a command signal having a plurality of command signal components, each command signal component having a distinct amplitude and a distinct frequency, the controller means comprising an adaptive filter for adjusting the amplitude of the command signal components in accordance with a dynamic behavior:

spectral preemphasis filter means for increasing the power of the signal components of the feedback signal and the adjusted command signal in proportion to the frequency of the respective signal components; and compensation means for approximating a dynamic behavior of the plant in response to outputs from the spectral preemphasis filter means to adjust the dynamic behavior of the adaptive filter.

17. The feedback control system according to claim 16 wherein each command signal component has a distinct frequency in a range of relatively high and low frequencies, and wherein the controller means further comprises:

filter means for passing the relatively high frequency command signal components through the adaptive filter and diverting the relatively low frequency command signal components from the adaptive filter; and summing means for adding the output of the adaptive filter and the diverted relatively low frequency command signal components to produce the adjusted command signal.

18. The feedback control system according to claim 17 wherein the feedback signal from the spectral preemphasis filter means comprises signal components, each signal component having a distinct amplitude and a distinct frequency in a range of relatively high and low frequencies, and wherein the compensation means comprises:

a second adaptive filter for adjusting the amplitude of the feedback signal components from the spectral preemphasis filter means in accordance with a dynamic behavior;

second filter means for passing relatively high frequency feedback signal components through the second adaptive filter and diverting the relatively low frequency feedback command signal components from the second adaptive filter; and second summing means for adding the output of the second adaptive filter and the diverted relatively low frequency feedback signal components to produce an adjusted feedback signal.

19. The feedback control system according to claim 16 wherein the plant controls a plurality of subsystems, each subsystem providing a respective feedback signal representative of the respective subsystem's achieved response to a respective adjusted command signal, wherein there are a plurality of the controller means and each of the controller means is responsive to a respective command signal to provide a respective adjusted command signal, wherein there are a plurality of spectral preemphasis filters for increasing the power of signal components of the respective feedback signal and the respective adjusted command signal, and wherein there are a plurality of the compensation means and each compensation means adjusts a dynamic behavior of the respective adaptive filter of the respective controller means in response to the respective output of the respective spectral preemphasis filter.

20. A feedback control system providing an adjusted command signal to a plant in response to a command signal, the plant controlling a subsystem and providing a feedback signal representative of the subsystem's achieved response to the adjusted command signal, the command signal and the feedback signal each comprising a respective plurality of signal components, each signal component having a distinct amplitude and a distinct frequency, the control system comprising:

controller means for providing the adjusted command signal and comprising a first adaptive filter for adjusting the power of the command signal components in accordance with a dynamic behavior of the first adaptive filter;

filter means for passing at least feedback signal components of relatively low frequency and for passing adjusted feedback signal components of relatively high frequency, the filter means including a second adaptive filter for adjusting the power of the high frequency feedback signal components in accordance with a dynamic behavior of the second adaptive filter; and compensation means responsive to the adjusted command signal and the output from the filter means to adjust the dynamic behavior of the first adaptive filter.

21. The feedback control system according to claim 20 wherein the first and second adaptive filters exhibit similar dynamic behavior and the compensation means similarly adjusts the dynamic behavior of both the first and second adaptive filters.

22. The feedback control system according to claim 20 wherein the filter means includes a low frequency filter for filtering the low frequency components of the command signal to represent a low frequency behavior of the plant.

* * * * *

UNITED STATES PATENT AND TRADEMARK OFFICE
CERTIFICATE OF CORRECTION

PATENT NO. : 5,339,016
DATED : August 16, 1994
INVENTOR(S) : BRADFORD K. THOEN

It is certified that error appears in the above-indentified patent and that said Letters Patent is hereby corrected as shown below:

Col. 3, line 26, delete "Art", insert --An--

Signed and Sealed this

Twentieth Day of December, 1994

Attest:

BRUCE LEHMAN

*Attesting Officer*    *Commissioner of Patents and Trademarks*